(12) United States Patent
Hoover et al.

(10) Patent No.: US 7,360,316 B2
(45) Date of Patent: Apr. 22, 2008

(54) LEVEL

(75) Inventors: Brandon C. Hoover, Cornelius, NC (US); Daniel R. Seymour, Mooresville, NC (US); Eric John Helda, Cornelius, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 0 days.

(21) Appl. No.: 11/162,183

(22) Filed: Aug. 31, 2005

(65) Prior Publication Data

US 2007/0044335 A1    Mar. 1, 2007

(51) Int. Cl.
*G01C 9/24* (2006.01)

(52) U.S. Cl. .............................. 33/379; 33/365; 33/451

(58) Field of Classification Search .................. 33/346, 33/365, 389, 377, 379, 381, 451
See application file for complete search history.

(56) References Cited

U.S. PATENT DOCUMENTS

| | | | | |
|---|---|---|---|---|
| 28,104 | A | * | 5/1860 | Nicholson ..................... 33/381 |
| 1,108,134 | A | * | 8/1914 | Cassity ........................ 33/381 |
| 1,362,813 | A | * | 12/1920 | Neidl .......................... 33/350 |
| 1,587,258 | A | * | 6/1926 | Vogel ........................... 33/381 |
| 1,982,178 | A | | 11/1934 | Rudolff |
| 2,535,791 | A | | 12/1950 | Fluke |
| 2,859,527 | A | | 11/1958 | Roche |
| 2,879,606 | A | | 3/1959 | Olivere |
| 3,213,545 | A | | 10/1965 | Wright |
| 3,296,708 | A | | 1/1967 | Moody |
| 3,921,306 | A | | 11/1975 | Provi |
| 4,335,524 | A | | 6/1982 | Schimming |
| 4,419,833 | A | * | 12/1983 | Wright ........................ 33/379 |
| 4,503,623 | A | * | 3/1985 | Gould, Jr. .................... 33/379 |
| 4,534,117 | A | * | 8/1985 | Haefner et al. ............... 33/379 |
| 4,593,475 | A | | 6/1986 | Mayes |
| 4,653,193 | A | | 3/1987 | Kennedy et al. |
| 4,685,219 | A | * | 8/1987 | Haefner et al. ............... 33/379 |
| 4,979,310 | A | | 12/1990 | Wright |
| 4,991,303 | A | * | 2/1991 | Marth et al. .................. 33/379 |
| 5,134,780 | A | | 8/1992 | Butler et al. |
| 5,279,041 | A | | 1/1994 | Wright |
| 5,412,876 | A | | 5/1995 | Scheyer |
| 5,459,935 | A | | 10/1995 | Paulson et al. |
| 5,479,717 | A | | 1/1996 | von Wedemeyer |
| 5,617,641 | A | | 4/1997 | Aarhus |

(Continued)

FOREIGN PATENT DOCUMENTS

| | | |
|---|---|---|
| EP | 0239030 | 3/1987 |
| GB | 2080529 | 2/1982 |

*Primary Examiner*—Christopher W Fulton
(74) *Attorney, Agent, or Firm*—Moore & Van Allen PLLC; Dennis J. Williamson; Matthew W. Witsil

(57) ABSTRACT

The level of the invention consists of a solid, thin central web that is connected to an upper box and a lower box. The central web supports level vials. The upper box and lower box have a hollow generally polygonal shape and define an upper surface and lower surface. A surface of either or both of the upper and lower boxes are calibrated with respect to the level vials to create leveling surfaces. The level vials are enclosed in housings that secure the level vials to the web. End caps are secured to the ends of the web and the upper and lower boxes.

18 Claims, 5 Drawing Sheets

U.S. PATENT DOCUMENTS

| | | |
|---|---|---|
| 5,709,034 A | 1/1998 | Kohner |
| 5,755,037 A | 5/1998 | Stevens |
| 5,940,978 A * | 8/1999 | Wright et al. ................. 33/381 |
| 6,167,631 B1 | 1/2001 | Lin |
| D440,507 S | 4/2001 | Krehel et al. |
| 6,279,240 B1 | 8/2001 | Bonaventura, Jr. |
| 6,293,023 B1 * | 9/2001 | Schooley .................... 33/374 |
| 6,418,634 B1 | 7/2002 | Szumer |
| 6,430,827 B2 | 8/2002 | Ruther |
| 6,568,095 B2 | 5/2003 | Snyder |
| D479,139 S | 9/2003 | Kallabis et al. |
| 6,760,975 B1 * | 7/2004 | Schmidt ...................... 33/382 |
| 6,792,686 B2 * | 9/2004 | Krehel et al. ................. 33/382 |
| 2001/0013176 A1 * | 8/2001 | Ruther ........................ 33/451 |
| 2003/0163927 A1 | 9/2003 | Kallabis et al. |

* cited by examiner

LEVEL

BACKGROUND

The invention relates generally to levels and more particularly to a level having an improved construction.

Traditional leveling tools consist of one or more level vials mounted in a level body. The level body has one or more leveling faces that are calibrated with reference to the level vials such that one of the leveling faces can be placed against a surface and level readings made from the level vials. Levels generally are one of two types. The first type is known as a box beam level where the level body is constructed as a hollow or solid box. The hollow box construction is typically used with levels made of metal such as aluminum. The solid box construction is typically used with wood levels although small solid cast torpedo levels are known. The second type of level is an I-beam level where the body is constructed of solid webs of material that have a generally I-shape transverse cross-section. The webs in an I-beam level are thin relative to their length and height such that these beams rely on the I-beam shape for rigidity.

It will be appreciated that in order to maintain the accuracy of the level it is important that the leveling faces that are calibrated with respect to the level vials remain true and do not bend, warp or become misshapen over time. Because levels are typically used in harsh environments such as construction sites, it is critical that the levels have a rigid construction. A box beam level derives its rigidity from the box structure combined with the amount of material used to create the box. Box beam levels generally are very rigid and maintain their accuracy over time. Box beam levels are, however, relatively heavy and expensive as compared to I-beam levels. I-beam levels while generally lighter and less expensive than box beam levels tend to be less rigid and are more likely to bend and become miscalibrated.

Thus, an improved level that has sufficient rigidity and yet is light and relatively inexpensive is desired.

SUMMARY OF THE INVENTION

The level of the invention consists of a solid, thin central web that is connected to an upper box and a lower box. The central web supports level vials. The upper box and lower box have a hollow generally polygonal shape and define leveling surfaces that are calibrated with respect to the level vials. The leveling surface is placed against an object such as a wall or floor such that the level vials can be viewed. In one embodiment the web and the upper box and lower box are extruded as a single piece of aluminum. The level vials are enclosed in housings that secure the level vials to the web. End caps are secured to the ends of the web and the upper and lower boxes. The end caps may include male mating portions that are inserted into the upper and lower boxes and a female receptacle that receives the web.

DETAILED DESCRIPTION OF PREFERRED EMBODIMENTS OF THE INVENTION

Figures 1, 2, 3:
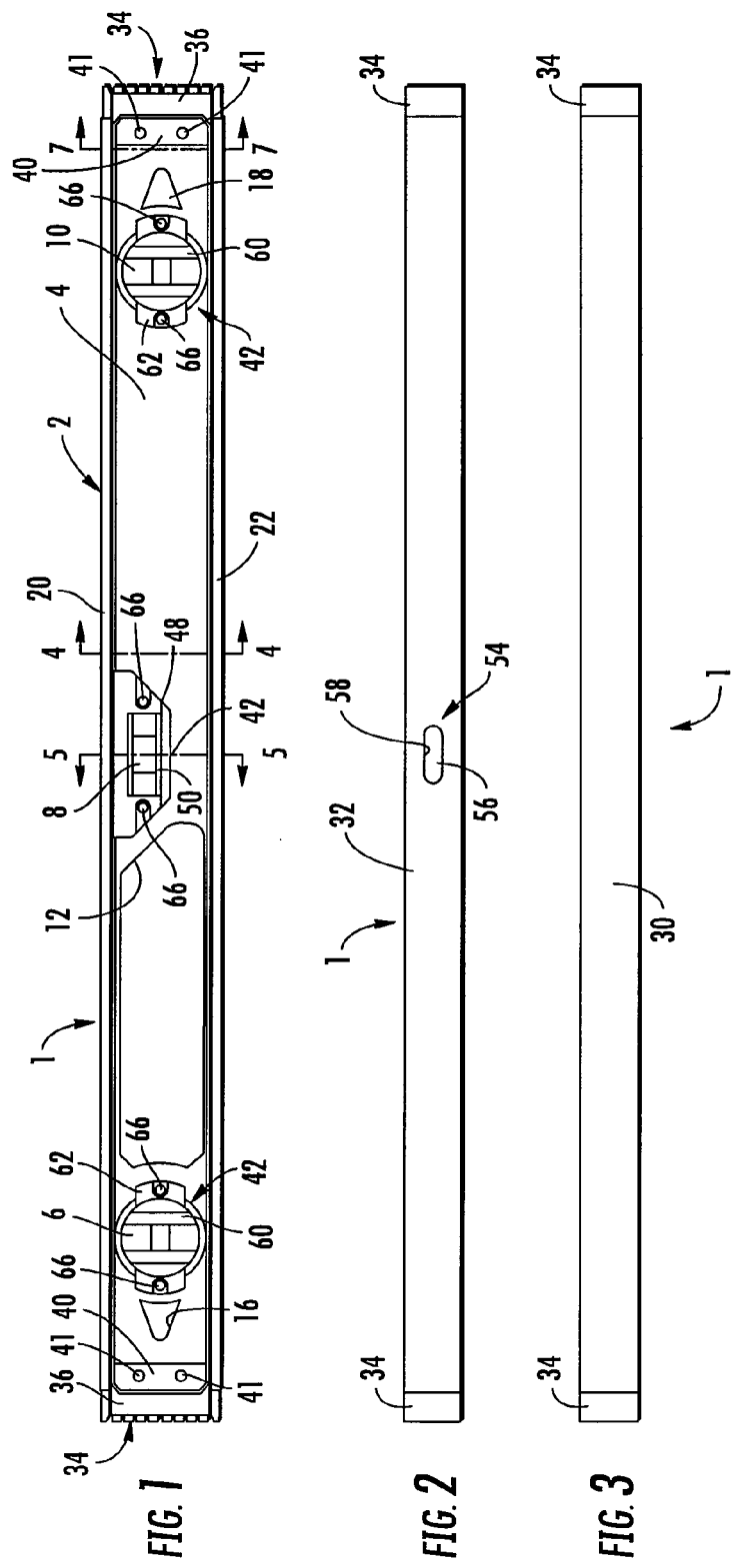
FIG. 1 is a front view of one embodiment of the level of the invention.
FIG. 2 is a top view of the embodiment of the level of FIG. 1.
FIG. 3 is a bottom view of the embodiment of the level of FIG. 1.

Referring to FIGS. 1 through 4 the level of the invention is shown generally at 1 and consists of a level body 2 having a solid central web 4 that is formed so that its thickness t is substantially less than its height h. The ratio of h to t may be 10:1. The central web 4 is substantially the same thickness as the webs of conventional I-beam levels. The length of the web 4 depends on the overall size of the level, it being appreciated that levels come in different sizes for different applications with a typical range from 12 inches to 6 feet. Web 4 supports level vials 6, 8 and 10 as will hereinafter be described. The level vials may be arranged with the longitudinal axes of the vials disposed at different angles relative to the level's calibrated level face to allow the level to be used to indicate level, plumb and oblique angles such as 45 degrees. Web 4 is also formed with aperture 12 that may be used as a hand hold and smaller apertures 16 and 18 that may be used to hang the level on a hook.

Web 4 is connected to an upper box 20 and a lower box 22. In one embodiment the web 4, upper box 20 and lower box 22 are integrally formed of a single piece of material such as extruded aluminum. The web 4, upper box 20 and lower box 22 may also be formed as separate pieces and then joined together such as by welding. Moreover the web 4, upper box 20 and lower box 22 may be formed from other material such as plastic, wood or other rigid material.

Figure 4:
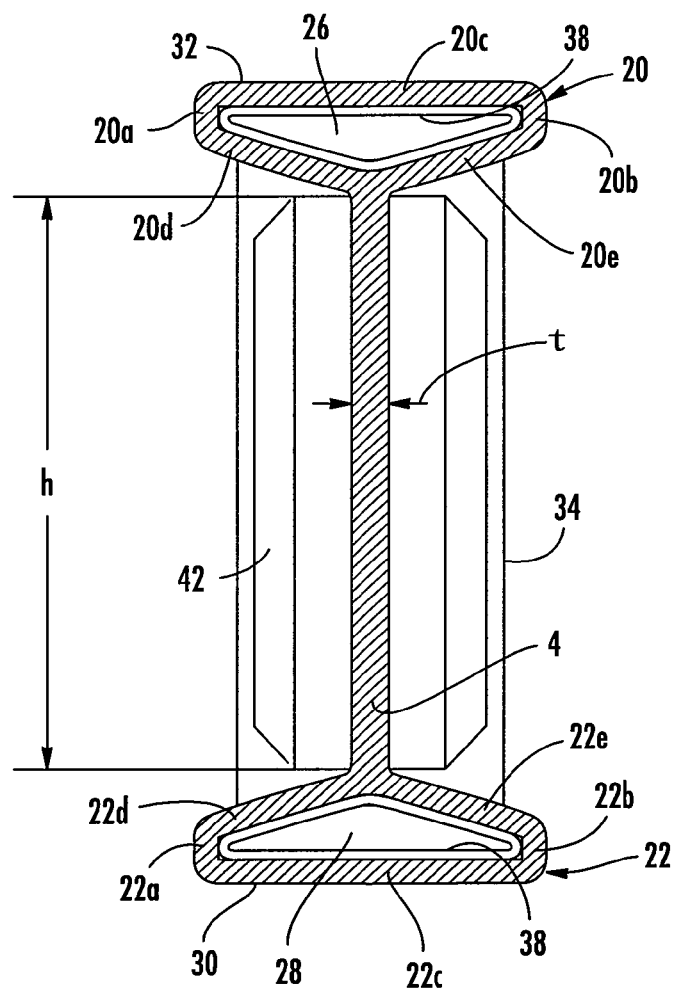
FIG. 4 is a section view taken along line 4-4 of FIG. 1.

Referring to FIG. 4, the upper box 20 has a polygonal transverse cross-section shape with side walls 20a and 20b, an outer wall 20c and inner walls 20d and 20e. Likewise, the lower box 22 has a polygonal transverse cross-section shape with side walls 22a and 22b, an outer wall 22c and inner walls 22d and 22e. In the illustrated embodiment, the upper box 20 and lower box 22 have side walls that are relatively short compared to the outer walls and inner walls such that the upper box and lower box have a generally triangular cross-section. The upper box 20 is formed with an internal void 26 that extends substantially the length of the level such that upper box 20 is hollow. Upper box 20 is arranged such that the outer wall 20c is disposed substantially perpendicular to web 4. The lower box 22 may be identical to upper box 20 and is also formed with an internal void 28 that extends substantially the length of the level such that lower box 22 is hollow. Lower box 22 is arranged such that the outer wall 22c is disposed substantially perpendicular to web 4.

In order to ensure that the level 1 is accurate, it is necessary calibrate at least one of the level body surfaces to the level vials. In one embodiment the exterior surface 30 of outer wall 22c is calibrated with respect to the level vials such that surface 30 is the leveling surface that is placed against the surface to be leveled. It will be appreciated that another exterior surface such as exterior surface 32 of outer wall 20c may be calibrated to the level vials in place of surface 30 or in addition to surface 30.

By combining the thin web 4 with the upper box 20 and lower box 22 the level body 1 of the invention is stronger than a conventional I-beam level yet is lighter and less expensive to manufacture than a box beam level. The level of the invention can better resist bending forces than an I-beam level without employing the material and associated weight and bulk of a box beam level.

Figure 6:
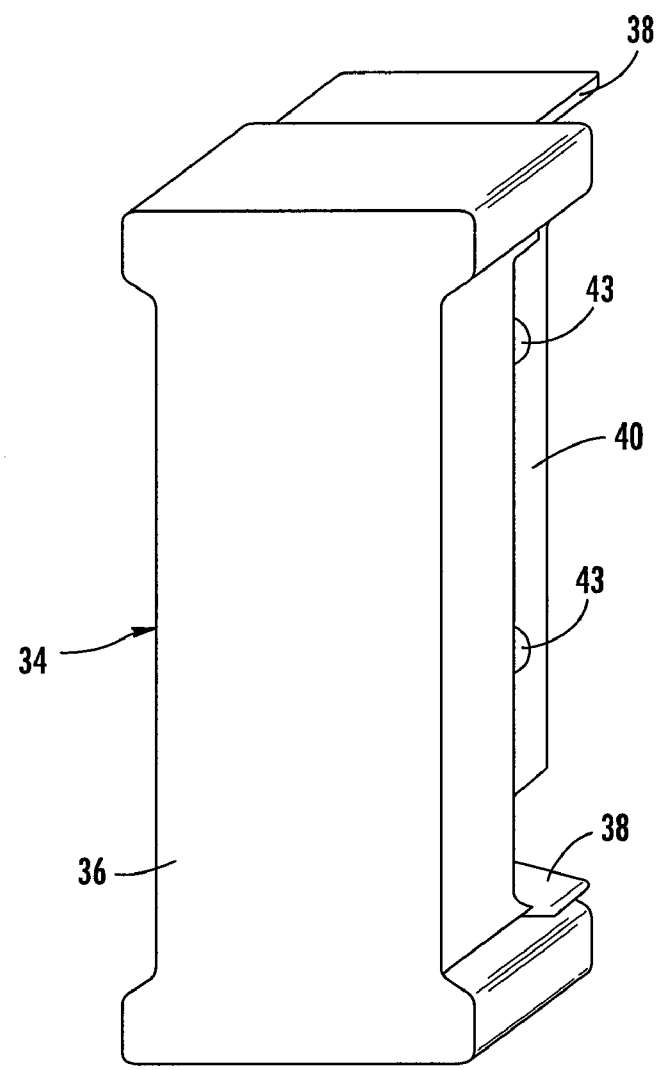
FIG. 6 is a perspective view of one embodiment of the end caps used on the level of the invention.

Each end of body 1 is protected by an end cap 34 that may be made of an elastomeric material that can absorb impacts. Referring to FIG. 6, end cap 34 comprises a base 36 that may be the approximate size and shape of the area bounded by the profile of level body 1. Located near each end of the base 36 are protrusions 38 that are dimensioned to fit within the voids 26 and 28 formed in the upper box 20 and the lower box 22, respectively. In one embodiment the protrusions 38 have the same shape as the void defined by the side walls and outer wall of the boxes. The protrusions may be dimensioned so as to tightly fit within the voids to help retain the end caps on the level body 1. The protrusions may also be connected to the level body using adhesive.

Figure 7:
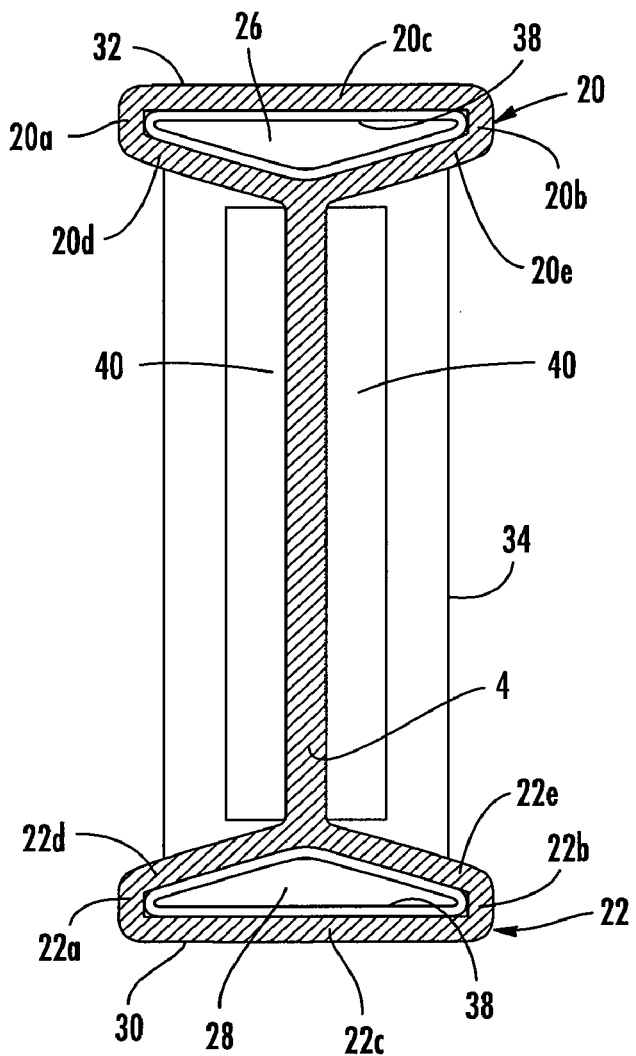
FIG. 7 is a section view taken along line 7-7 of FIG. 1.

Also extending from base 36 are a pair of flanges 40. Flanges 40 are spaced from one another a distance approximately equal to or slightly greater than the thickness t of web 4. The end of web 4 is fits in the space between the flanges 40 as shown in FIG. 7. The end cap can be further secured to the body using adhesive or fasteners such as rivets or screws 41 that engage holes 43 formed on the flanges 40 and on the web 4 (not shown). Moreover the flanges 40 can be formed with protrusions that snap fit into mating depressions formed in web 4 to mechanically secure the end caps to the web. The use of an end cap having both a female connecting portion (the space between the flanges 40) and a male connecting portion (protrusions 38) provides a secure connection between the end caps and the level body.

Figure 5:
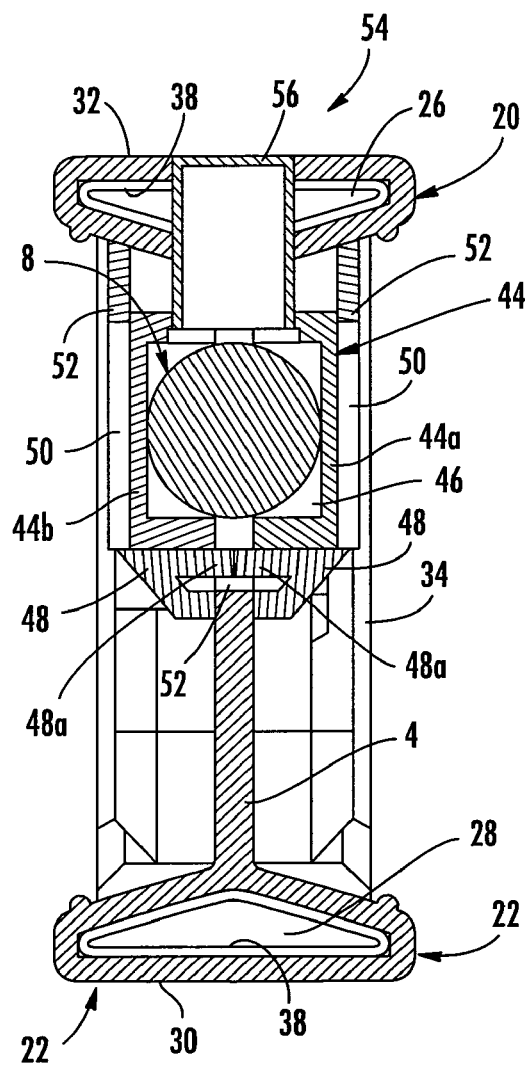
FIG. 5 is a section view taken along line 5-5 of FIG. 1.

Level vials 6, 8 and 10 may consist of a cylindrical bubble vial as is known in the art and are mounted to web 4 in a level vial assembly 42. Description will be made to one level vial assembly, it being understood that each level vial assembly 42 has a similar construction. Referring to FIG. 5, a transparent vial cover 44 covers the vial and consists of two halves 44a and 44b, one located on either side of web 4. In the illustrated embodiment the transparent vial cover 44 defines a cavity 46 for closely receiving the level vial 8. Cavity 46 may also conform to the outer shape of the vial. The vial cover 44 is located in a through hole 52 formed in web 4. Retainer rings 48 are located on either side of the web 4 and are shaped to fit into the through hole 52 to support and retain the vial cover on web 4. Specifically the retainer ring 48 includes a portion 48a that extends into through hole 52 and supports the vial cover 44. An opening 50 is formed in the retainer ring to allow viewing of the bubble vial through the vial cover. The edge of opening 50 defines a flange 52 that engages an edge of the vial guard 44 to retain the vial cover in position. In the illustrated level vial assembly, a window 54 is also included that allows the vial to be viewed from face 32. Window 54 includes a transparent open ovate member 56 supported by upper box 20 and that extends through a cut out 58 formed in wall 20c to allow a user visual access to level vial 8.

The level vial assemblies 42 that support level vials 6 and 10 are similar in construction to the level vial assembly that supports level vial 8 except that the window 54 is not included. Also, the vial covers 60 and retainer rings 62 have a circular shape. Fasteners such as screws or rivets 66 are used to secure the retainer rings 48 and 60 to the web 4.

Specific embodiments of an invention are disclosed herein. One of ordinary skill in the art will recognize that the invention has other applications in other environments. Many embodiments are possible.

What is claimed is:

1. A level comprising:
   a first hollow box structure extending substantially the length of the level and having a generally triangular cross-section;
   a second hollow box structure extending substantially the length of the level and having a generally triangular cross-section; and
   a relatively thin solid web extending substantially the length of the level and connecting the first box structure to the second box structure;
   said first box structure, said second box structure and said web being made of a single piece of extruded aluminum wherein said level is a rigid structure that resists bending.

2. The level according to claim 1 wherein the web supports a level vial.

3. The level according to claim 2, wherein a surface of one of the first box structure or second box structure has a leveling face.

4. The level according to claim 2 wherein the level vial is supported in a transparent cover and said cover is secured to the web with a retainer ring.

5. The level according to claim 4 wherein the retainer ring is secured to the web.

6. The level according to claim 4 further including a second retainer ring, said retainer ring being on one side of the web and said second retainer ring being on a second side of the web.

7. The level according to claim 4 wherein the retainer ring has a portion that is disposed between the web and the level vial.

8. The level according to claim 4 wherein the retainer ring includes a flange contacting said cover.

9. The level according to claim 1 further including an end cap attached to the first box structure, said end cap including a flange inserted into the first box structure.

10. The level according to claim 1 further including an end cap attached to the web, said end cap including a space for receiving the web.

11. A level comprising:
    a first box structure defining an internal void extending substantially the length of the level;
    a second box structure defining an internal void extending substantially the length of the level, said second box structure being defined by a plurality of walls formed intregally in a unitary, single piece wherein one of said plurality of walls forms a leveling face that is calibrated with respect to a level vial;
    a relatively thin solid web extending substantially the length of the level and connecting the first box structure to the second box structure;
    said first box structure, said second box structure and said web being formed as a unitary, single piece member; and
    said level vial supported on said web.

12. The level according to claim 11 further including an end cap attached to the first box structure, said end cap including a flange inserted into the first box structure.

13. The level according to claim 11 further including an end cap attached to the web, said end cap including a space for receiving the web.

14. The level according to claim 11 further including a handgrip formed in the web.

15. A level comprising:
    a first hollow box structure having an interior and extending substantially the length of the level;
    a second hollow box structure having an interior and extending substantially the length of the level; and a relatively thin solid web extending substantially the length of the level and connecting the first box structure to the second box structure; and an end cap secured to the end of the level, said end cap having a first male connecting portion dimensioned to be received in the interior of said first box structure and a second male connecting portion dimensioned to be received in the interior of said second box structure and a female connecting portion including a pair of flanges spaced to receive the web therebetween.

16. The level of claim 15, wherein the web includes a depression and the female connecting portion mates with the web with a snap-fit connection in the depression.

17. A level comprising:

a first hollow box structure extending substantially the length of the level;

a second hollow box structure extending substantially the length of the level; and a relatively thin solid web extending substantially the length of the level and connecting the first box structure to the second box structure; and a transparent vial cover defining a cavity for receiving a level vial located in a hole formed in said web, a first retainer located on a first side of the web including a first portion that extends into said hole and supports the vial cover in position and a second portion that engages the web adjacent said hole, a second retainer located on the opposite side of the web including a first portion that extends into said hole and supports the vial cover in position and a second portion that engages the web adjacent said hole.

18. The level of claim 17 further including fasteners for securing the first and second retainers to the web.

* * * * *